(12) United States Patent
Andersson et al.

(10) Patent No.: US 6,947,428 B1
(45) Date of Patent: Sep. 20, 2005

(54) DISTRIBUTED LABEL SWITCHING ROUTER

(75) Inventors: Loa Andersson, Skovelagen (SE); Geoffery A. Mattson, Antibes (FR)

(73) Assignee: Nortel Networks Limited, St. Laurent (CA)

( * ) Notice: Subject to any disclaimer, the term of this patent is extended or adjusted under 35 U.S.C. 154(b) by 871 days.

(21) Appl. No.: 09/869,679

(22) PCT Filed: Jun. 14, 2000

(86) PCT No.: PCT/US00/16361
§ 371 (c)(1),
(2), (4) Date: May 21, 2002

(87) PCT Pub. No.: WO01/97460
PCT Pub. Date: Dec. 20, 2001

(51) Int. Cl.[7] .............................................. H04L 12/28
(52) U.S. Cl. ................... 370/395.5; 370/230; 370/236; 370/401; 370/466
(58) Field of Search .............................. 370/230, 236, 370/248, 238, 395.5, 395.51, 401, 466, 467, 410; 709/227, 228, 229, 245

(56) References Cited

U.S. PATENT DOCUMENTS

| | | | |
|---|---|---|---|
| 6,466,985 B1 * | 10/2002 | Goyal et al. ................ | 709/238 |
| 6,611,532 B1 * | 8/2003 | Madour et al. ............. | 370/466 |
| 6,728,777 B1 * | 4/2004 | Lee et al. .................... | 709/238 |
| 6,731,639 B1 * | 5/2004 | Ors et al. ................. | 370/395.51 |
| 6,738,354 B1 * | 5/2004 | Ashwood Smith .......... | 370/248 |
| 6,778,494 B1 * | 8/2004 | Mauger ....................... | 370/230 |
| 6,778,531 B1 * | 8/2004 | Kodialam et al. .......... | 370/390 |
| 2002/0110119 A1 * | 8/2002 | Fredette et al. ............. | 370/389 |

FOREIGN PATENT DOCUMENTS

EP 0952755 10/1999 ........... H04Q/11/04

OTHER PUBLICATIONS

Le Faucheur, F., "IETF Multiprotocol Label Switching (MPLS) Architecture", IEEE International Conference Jun. 1998 p. 6–15, XP–002115225.

Armitage G., "MPLS: The Magic Behind the Myths", IEEE Communications Magazine, Jan. 2000, p. 124–131.

Jamoussi, B., "Constraint–Based LSP Setup using LDP" Internet Draft, MPLS Working Group, Feb. 1999.

* cited by examiner

*Primary Examiner*—Ricky Ngo
*Assistant Examiner*—Son X. Nguyen
(74) *Attorney, Agent, or Firm*—Trop, Pruner & Hu, P.C.

(57) ABSTRACT

A distributed LSR sends data from a first edge LSR, across a non-MPLS network, to a second edge LSR, thereby enabling a non-MPLS network to interface transparently with MPLS networks. This enables a VPN to use a public network to communicate from one portion of the network to another, remote portion. The distributed LSR includes an ingress gateway logically positioned between the first edge LSR and the non-MPLS network. This ingress gateway receives label requests from the first edge LSR. These label requests are multicast to several egress gateways. At least one egress gateway sends a message back indicating that it can transmit data to the destination. In response, the ingress gateway designates that egress gateway to be a designated gateway. The egress gateway then establishes a tunnel through the non-MPLS network to the ingress gateway.

21 Claims, 3 Drawing Sheets

DISTRIBUTED LABEL SWITCHING ROUTER

FIELD OF INVENTION

This application relates to data communication networks, and in particular, to interfaces between MPLS networks and non-MPLS networks.

BACKGROUND

A network typically includes a collection of routers interconnected with each other. From a data packet's point of view, each router is a stepping stone toward its destination. To traverse the network from its source to its destination, a data packet engages in a sequence of "hops" from one router to the next.

Each router in a network is a device having an input side with at least one input connected to an adjacent router and an output side with several outputs, each of which is connected to an adjacent router. The router receives a data packet through its input and forwards the data packet to an adjacent router through one of its several outputs. The function of a router is to decide, for each data packet arriving at its input, which of the several adjacent routers it is to relay the data packet to. Typically, a router accomplishes this by examining a header associated with the data packet to determine that data packet's destination. Using a look-up table, the router then determines which of the adjacent routers on its output side is the appropriate router for the data packet's next hop toward its destination.

In order for a network to operate correctly, it is preferable that each router understand the information contained in the header associated with the data packet. This can create difficulties when, in order to reach its destination, the data packet traverses a network in which the routers are unable to recognize the information contained within the header. This can occur when a router understands only a protocol other than that used to generate the header.

An MPLS ("multi-protocol label switching") network is based on the recognition that information for relaying the data packet on its next hop need be understood only by two adjacent routers. In an MPLS network, each data packet is encapsulated by a label. Each router on an MPLS network operates by receiving the labeled data packet through its input side and determining, on the basis of information in the label, which router to relay the data packet to on its output side. Then, the router switches the label with a new label containing information that can be understood by the next router to receive the data packet. The label is thus of only local significance and is typically switched to a new label before every hop. Because a router on an MPLS network switches the label associated with the data packet, such a router is referred to as a "label-switching router" or "LSR."

It is apparent that the LSRs in an MPLS network need not recognize or understand the header of the data packet. The LSRs need only recognize labels. As a result, a data packet can readily traverse networks in which the routers are incapable of recognizing its header. All that is necessary is that each router in the network be a label switching router. It is for this reason that an MPLS network is a "multi-protocol" network.

SUMMARY

A distributed LSR according to the invention includes an ingress gateway logically positioned between a first edge LSR and the non-MPLS network. This ingress gateway receives a label request from the first edge LSR and instructs a multicast agent to relay this label request from the ingress gateway, across a non-MPLS network, to a plurality of egress gateways. The multicast agent also relays responses, if any, from the egress gateways, across the non-MPLS network, and back to the ingress gateway. Preferably, the multicast agent maintains at least one table specifying the egress gateways corresponding to a particular virtual private network.

Among the egress gateways is a designated gateway, which is typically elected from the egress gateways on the basis of whether a connection can be made between that egress gateway and an address specified in the label request message. The designated gateway is logically positioned between the second edge LSR and the non-MPLS network.

The non-MPLS network can be a conventional packet switching network such as an IP network. In this case, the distributed LSR preferably includes an ingress IP router logically positioned between the ingress gateway and the multicast agent and an egress IP router logically positioned between the egress gateway and the IP network.

To avoid having the ingress gateway wait interminably for a response from the egress gateways, the ingress gateway preferably includes a timer for detecting the lapse of a predetermined interval following transmission of the label request.

Preferably, the distributed LSR also includes confirmation means for sending a confirmation message to the egress gateways. This confirmation message specifies the designated gateway for the communication path. The confirmation message can be sent to all egress gateways responding to the label request message or only to those egress gateways that are not to become the designated gateway.

For some VPN topologies, the destination requested in a label request message may be accessible by more than output edge router. Under these circumstances, there exists the possibility that more than one egress gateway will send a label mapping message back to the ingress gateway. To address this possibility, the distributed LSR preferably includes selection means for selecting a designated gateway from a plurality of responses from the plurality of egress gateways. This selection can be made on a first-come-first-served basis, in which case the designated gateway is the first egress gateway to respond, or by determining which of the responding egress gateways is the optimal egress gateway.

According to an additional aspect of the invention, the distributed LSR receives a label request from a first edge LSR and multicasts that label request across the non-MPLS network to a plurality of egress gateways. At least one egress gateway then generates a response indicating that there exists a communication path between a second edge LSR and that responding egress gateway. Upon receipt of this response, the ingress gateway then designates the responding egress gateway to be the designated gateway for transmission of data to the second edge LSR.

Where the first and second LSRs are associated with VPNs, it is advantageous to maintain a secure link across the non-MPLS network. For this reason, it is preferable that a tunnel be established across the non-MPLS network between the ingress gateway and the designated gateway.

Preferably, the ingress gateway waits only a predetermined interval for responses before assuming that communication is not currently available. This ensures that the ingress gateway will not wait an interminable period for a response.

Following designation of a designated gateway, the ingress gateway preferably sends a confirmation message to the egress gateways. This confirmation message can be sent to all egress gateways or all egress gateways other than the designated gateway.

The invention thus provides a method and system for interfacing a non-MPLS network with an MPLS network in a gradual and controlled manner without the need to replace each router in the non-MPLS network with an LSR. This is accomplished by having the entire non-MPLS network appear to the MPLS network as a single, virtual, LSR. This is a significant advantage because the conversion of a potentially large number of routers in a non-MPLS network requires a period during which the network will be non-operational.

The single, virtual LSR of the invention is a distributed LSR because it performs the functions of a conventional LSR through the cooperation of several routers. Like a conventional LSR, the distributed LSR accepts a labeled data packet at its input port, switches the label on the data packet, and sends the data packet, with its new label, out a selected output port. However, unlike a conventional LSR, the distributed LSR of the invention does not rely on a label information base to accomplish label switching. Instead, an ingress gateway in the distributed LSR instructs a multicasting agent to multicast a label request, across a non-MPLS network, to each of a plurality of egress gateways. If a route to a destination from a particular egress gateway is available, that egress gateway then sends a label mapping message back to the ingress gateway.

On the basis of the label mapping messages received from the egress routers, the ingress router selects one of the egress routers to complete the LSP (label-switching protocol). The distributed LSR then creates a tunnel within the non-MPLS network for communication between the ingress router and the egress router.

Other features and advantages of the invention will be apparent upon examination of the following detailed description and the accompanying figures in which:

DETAILED DESCRIPTION

Figure 1:
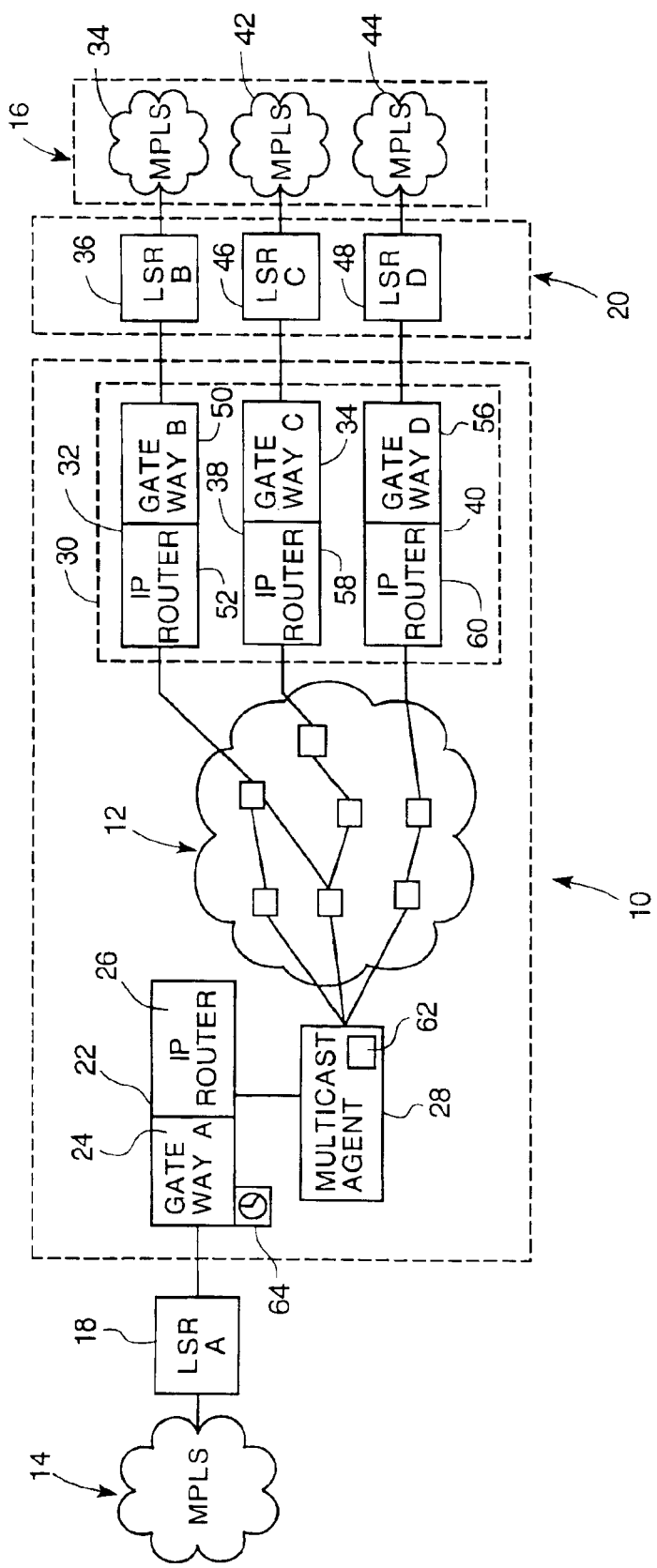
FIG. 1 is a schematic diagram of the architecture of a distributed LSR according to the invention.

Referring to FIG. 1, a distributed label-switching router (LSR) 10 interfaces a non-MPLS network 12 with both an input MPLS network 14 and with a plurality of output MPLS networks 16. In the illustrated embodiment, the input MPLS network 14 and the plurality of output MPLS networks 16 form two parts of a virtual private network (VPN). In the context of this description, the non-MPLS network is an IP network 12, however other packet switching networks can be substituted for the IP network 12.

The IP network 12 is a public network that links these two parts of the VPN. To maintain security of the VPN, data preferably travels along a secure path when traversing the IP network 12. This is achieved by establishing a tunnel across the IP network 12. The distributed LSR 10 dynamically establishes such tunnels on an as-needed basis.

The input MPLS network 14 connects to the distributed LSR 10 through an input edge LSR 18. Similarly, the output MPLS networks 16 connect to the distributed LSR 10 through a plurality of output edge LSRs 20. Both the input edge LSR 18 and the output edge LSRs 20 are MPLS egress routers running LDP and operating in downstream on-demand mode with conservative label retention. Both the input edge LSR 18 and the output edge LSRs 20 perform the ingress and egress functions specified by the conventional MPLS architecture. Preferably, the distributed LSR 10 uses MPLS signaling rather than conventional frame relay signaling to minimize the extent of the routing information exchanged between ingress router and the egress router. This results in a simpler and more scalable network. Each edge LSR shown in FIG. 1 communicates with the distributed LSR 10 through a frame-relay interface. However, the edge LSRs can also communication with the distributed LSR through other WAN interfaces.

The distributed LSR 10 interfaces with the input MPLS network 14 through an ingress router 22 connected to the input edge LSR 18. An ingress gateway 24 logically positioned between the input edge LSR 18 and a first IP router 26 provides the interface between the ingress router 22 and the input edge LSR 18. Through a multicast agent 28, the ingress router 22 interfaces with the IP network 12 that provides communication paths between the ingress router 22 and a plurality of egress routers 30.

For purposes of illustration, FIG. 1 shows a first egress router 32 in communication with a first output network 34 through a first output edge LSR 36. Similarly, FIG. 1 shows second and third egress routers 38, 40 in communication with second and third output networks 42, 44 through second and third output edge LSRs 46, 48 respectively. However, the plurality of egress routers 30 can include any number of constituent egress routers.

The structures of the egress routers 32, 38, 40 mirror that of the ingress router 22. For example, the first egress router 32 includes a first egress gateway 50 logically positioned between a second IP router 52 and the first output edge LSR 36. The first egress gateway 50 interfaces with the first output edge LSR 36 while the second IP router 52 interfaces with the IP Network 12. Similarly, the second and third egress routers 38, 40 include second and third egress gateways 54, 56 logically positioned between the third and fourth IP routers 58, 60 and the second and third output edge LSRs 46, 48 respectively. The second and third egress routers 38, 40 interface with the IP network 12 through the third and fourth IP routers 58, 60 respectively and with the second and third output edge LSRs 46, 48 through the second and third egress gateways 54, 56 respectively.

In operation, the input edge LSR 18 and the ingress gateway 24 establish an LDP (label distribution protocol) session between each other using conventional discovery and initialization procedures. This is equivalent to setting up an LDP session between two LSRs in conventional MPLS networking. Little or no routing information is exchanged between the ingress gateway 24 and the input edge LSR 18 during establishment of an LDP session. It is sufficient that the input edge LSR 18 use the ingress gateway 24 as a default router or default next hop for addresses within the VPN. This implies that to resolve an address within the VPN, the input edge LSR 18 sends the ingress gateway 24 a label request message specifying a destination address.

In response to a label request message from the input edge LSR 18, the ingress gateway 24 communicates the label request message to the multicast agent 28. For each VPN serviced by the distributed LSR 10, the multicast agent 28 maintains a router table 62 listing all egress routers associated with that VPN. As a result, changes to the topology of a particular VPN are easily implemented by adding and deleting egress routers from the appropriate router table 62.

The multicast agent 28 relays the label request to the all the egress routers in its router table 62, which in the example of FIG. 1 includes the first, second, and third egress routers 32, 28, 40. The first, second, and third egress routers 32, 28, 40 then forward the label request to the first, second, and third output edge LSRs 36, 46, 48, each of which has established an LDP session with its corresponding egress gateway 50, 54, 56. Each of the output edge LSRs 36, 46, 48 includes a routing table listing all destinations accessible by that edge LSR.

Each of the first, second, and third output edge LSRs 36, 46, 48 determines, independently of the others, whether the destination address specified in the label request message is within its respective routing table. If one of the output edge LSRs, for example the first output edge LSR 36, determines that the destination address is in its routing table, it sends a label mapping message back to the first egress gateway 50 to which it is connected. The first egress gateway 50 then forwards the label mapping message across the IP network 12 to the ingress gateway 24.

Upon receipt of a label mapping message, the ingress gateway 24 designates the responding egress gateway (in this case the first egress gateway 50) to be the designated gateway for the ensuing label switched path (LSP) between the ingress gateway 24 and the responding output edge LSR 36. The first egress gateway 50, which is now the designated gateway, then establishes a tunnel across the IP network 12 between itself and the ingress gateway 24. This establishes an LSP path between the input edge LSR 18 and the first output edge LSR 36. The resulting LSP path includes three distinct path segments: (1) a segment from the input edge LSR 18 to the ingress gateway 24, which is labeled in normal MPLS fashion; (2) a segment from the ingress gateway 24 to the first egress gateway 50, in which traffic is carried in an IP tunnel; and (3) a segment from the first egress gateway 50 to the first output edge LSR 36, which is labeled in normal MPLS fashion.

In a preferred embodiment, upon receipt of a label mapping message from any one of the egress gateways 50, 54, 56, the ingress gateway 24 instructs the multicast agent 28 to relay to all the egress gateways 50, 54, 56 a confirmation message containing the identity of the designated gateway. Each egress gateway 50, 54, 56 checks the identity of the designated gateway specified in this confirmation message. If the identity of the designated gateway differs from that of the egress gateway, the egress gateway releases the LSP at its interface with its corresponding output edge LSR. If the output edge LSR connected to the egress gateway has already responded, this is achieved by sending a label abort notification message to the output edge LSR.

Alternatively, the ingress gateway 24 can instruct the multicast agent 28 to send a message only to those egress gateways that are not the designated gateway. This message instructs those egress gateways to abort any LSP established in response to the original label request message.

Preferably, the ingress gateway 24 includes a timer 64 that begins counting down upon transmission of the label request message. If, at the expiration of a predetermined interval the ingress gateway 24 fails to receive any response from the egress gateways 50, 54, 56, the ingress gateway 24 sets the address of the designated gateway to be a null address and sends a confirmation message, as described above.

Figure 2:
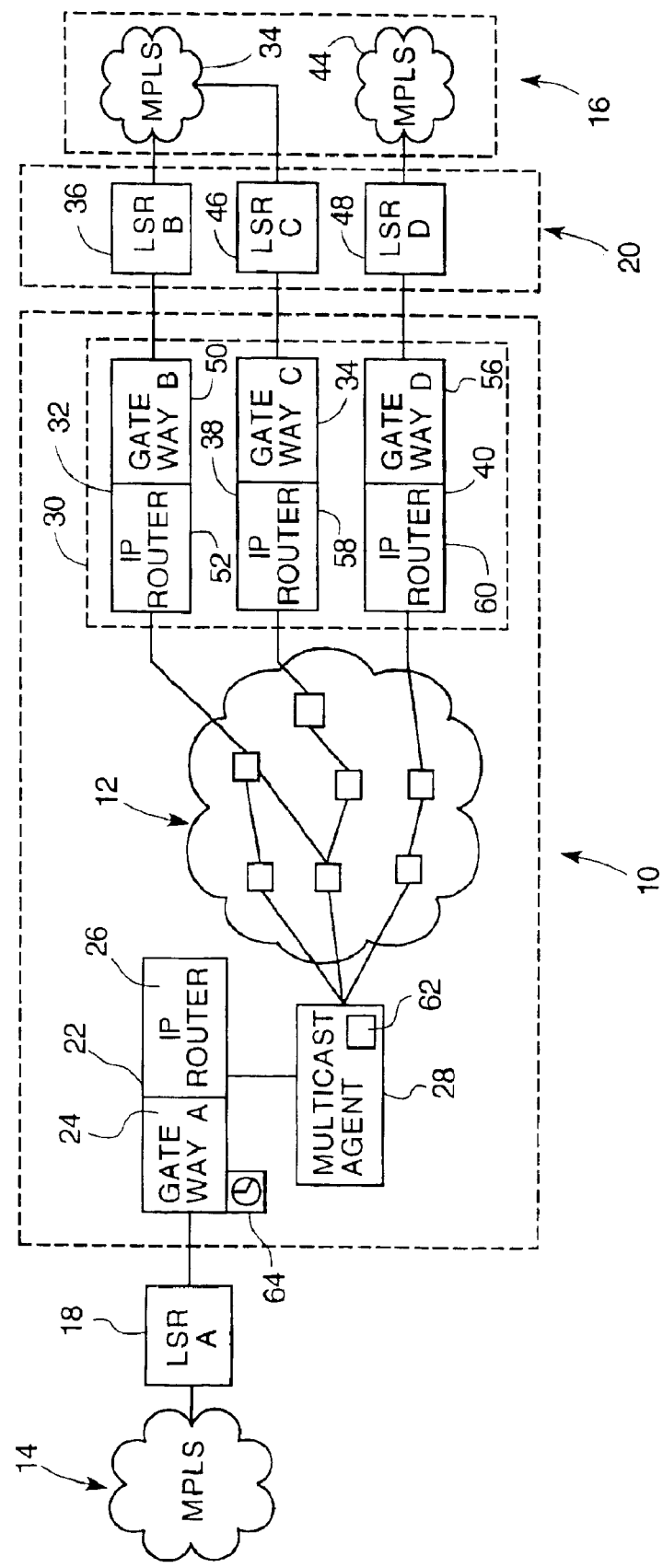
FIG. 2 is the distributed LSR of FIG. 1 but with two output edge LSRs communicating with the same output MPLS network.

For some VPN topologies, as shown in FIG. 2, a particular destination address may be in two different router tables associated with two different output edge routers. Under these circumstances, the ingress gateway 24 may receive two label mapping messages. Although a VPN topology of the type shown in FIG. 2 is both uncommon and undesirable, it is preferable that the ingress gateway 24 be provided with a mechanism for designating an egress gateway for the LDP session from a plurality of responding egress gateways. This choice can be made randomly, for example on a first-come-first-served basis. Alternatively, the choice can be made on the basis of which egress gateway is perceived to be optimal. For example, if one of the two responding egress gateways is notoriously busy, the designated egress gateway might be the less busy egress gateway.

Figure 3:
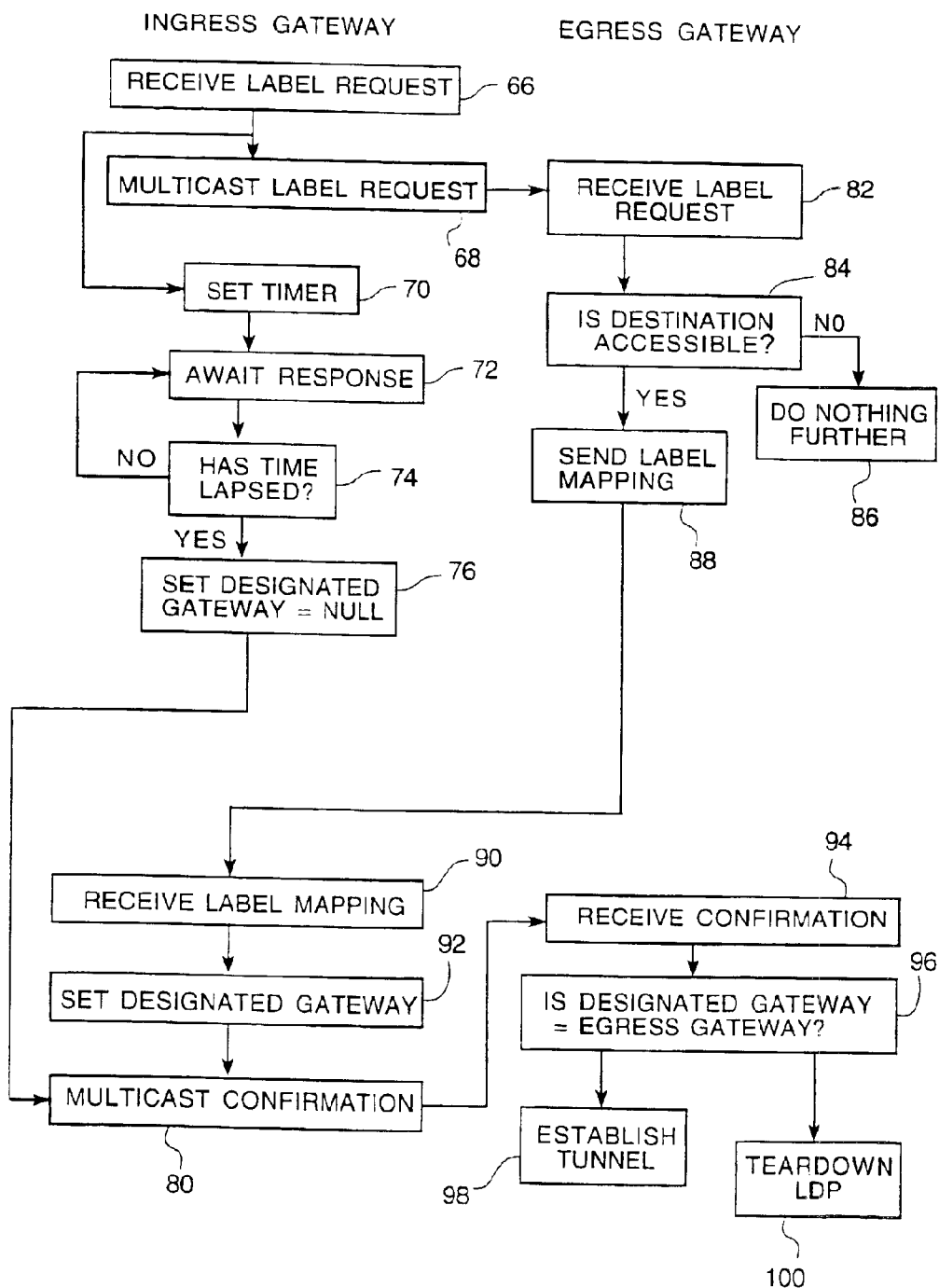
FIG. 3 is a flow chart of the process carried out by the distributed LSR of FIG. 1.

Referring now to FIG. 3, the process of establishing a communication path between the input edge LSR and the output edge LSR begins with the receipt 66, by the ingress gateway, of a label request message from the input edge LSR. The ingress gateway then instructs 68 the multicast agent to multicast the label request message across the IP network to the egress gateways. Concurrently, the input edge LSR sets 70 a timer and waits 72 for a response.

Periodically, the ingress gateway checks 74 the timer to see if a waiting interval has elapsed. If the waiting interval has not yet elapsed, the ingress gateway continues 72 to wait for a response. If the waiting interval has elapsed and no response has been received from an egress gateway, the ingress gateway sets 76 the designated gateway to be a null gateway. A confirmation message specifying this designated gateway is then multicast 80 to the egress gateways.

Meanwhile, each egress gateway receives 82 the multicast label request message and establishes 84 an LDP session with output edge router to determine whether the destination specified in that message is accessible to it. If it is not, the egress gateway does nothing 86. If it is, then the egress gateway sends 88 a label mapping message back to the ingress gateway.

Upon receipt 90 of the label mapping message, the ingress gateway sets 92 the egress gateway that sent the label mapping message to be the designated gateway. A confirmation message specifying the designated gateway is then multicast 80 to the egress gateways.

In those rare cases in which the ingress gateway receives a label mapping message from more than one egress gateway, the ingress gateway selects a designated gateway, either on a first-come-first-served basis or by selecting the optimal egress gateway to be the designated gateway.

Each egress gateway then receives 94 the confirmation message and determines 96 whether it is to become the designated gateway. If the egress gateway determines that it is to become the designated gateway, it proceeds to establish 98 a tunnel across the IP network between itself and the ingress gateway. If the egress gateway determines that it is not to become the designated gateway, it proceeds to tear down 100 the LDP session, if any, established between itself and an output edge router.

It is apparent from the foregoing that the when ingress and egress gateways cooperate with a multicasting agent in the manner set forth above, encapsulates a non-MPLS network so that, from the point of view of an edge LSR, it appears to be no more than another LSR. This is achieved without the burden and expense of having to convert each router within the non-MPLS network into an LSR. In addition, the distributed LSR dynamically establishes tunnels through the non-MPLS network on an as-needed basis, thereby simplifying the task of adding and removing customers from a VPN.

It is to be understood that while the foregoing detailed description has described a selected embodiment of the invention, it is intended to illustrate and not to limit the scope of the invention. The invention, together with other aspects, advantages, and modifications thereof, are limited only by the scope of the appended claims.

What is claimed is:

1. A distributed label-switching-router for sending a data packet from a first edge label-switching-router, across a non-multi-protocol-label-switching network, to a second edge label-switching-router, said distributed label-switching-router comprising:

an ingress gateway logically positioned between said first edge label-switching-router and said non-multi-protocol-label-switching network, said ingress gateway receiving a label request from said first edge label-switching-router;

a multicast agent in communication with said ingress gateway and said non-multi-protocol-label-switching network for relaying said label request from said ingress gateway, across said non-multi-protocol-label-switching network, to a plurality of egress gateways, and for relaying at least one response from said plurality of egress gateways, across said non-multi-protocol-label-switching network, to said ingress gateway; and a designated gateway from said plurality of egress gateways, said designated gateway being logically positioned between said second edge label-switching-router and said non-multi-protocol-label-switching network.

2. The distributed label-switching-router of claim 1 wherein said non-multi-protocol-label-switching network is an internet protocol network.

3. The distributed label-switching-router of claim 2 further comprising an ingress internet protocol router logically positioned between said ingress gateway and said multicast agent.

4. The distributed label-switching-router of claim 2 further comprising an egress internet protocol router logically positioned between said egress gateway and said internet protocol network.

5. The distributed label-switching-router of claim 1 wherein said ingress gateway further comprises a timer for detecting the lapse of a predetermined interval following transmission of said label request.

6. The distributed label-switching-router of claim 1 wherein said multicast agent further comprises a table providing information indicative of which egress gateways from said plurality of egress gateways are associated with a virtual private network.

7. The distributed label-switching-router of claim 1 further comprising confirmation means for sending a confirmation message designating said designated gateway from said plurality of egress gateways.

8. The distributed label-switching-router of claim 7 wherein said confirmation means comprises means for sending said confirmation message to all egress gateways responding to said label request message.

9. The distributed label-switching-router of claim 7 wherein said confirmation means comprises means for sending said confirmation message to those egress gateways, other than said designated gateway, responding to said label request message.

10. The distributed label-switching-router of claim 1 further comprising selection means for selecting a designated gateway on the basis of said at least one response from said plurality of egress gateways.

11. The distributed label-switching-router of claim 1 further comprising selection means for selecting a designated gateway from a plurality of responses from said plurality of egress gateways.

12. The distributed label-switching-router of claim 1 wherein said designated gateway further comprises means for establishing a tunnel across said non-multi-protocol-label-switching network.

13. A method for sending a data packet from a first edge label-switching-router, across a non-multi-protocol-label-switching network, to a second edge label-switching-router, said method comprising:

receiving a label request from said first edge label-switching-router;

multicasting said label request, across said non-multi-protocol-label-switching network, to a plurality of egress gateways;

receiving at least one response from at least one egress gateway from said plurality of egress gateways, said at least one response indicative of a communication path between said second edge label-switching-router and said at least one egress gateway; and designating said at least one egress gateway to be a designated gateway for communication between said first edge label-switching-router and said second edge label-switching-router.

14. The method of claim 13 further comprising establishing a tunnel across said non-multi-protocol-label-switching network.

15. The method of claim 13 further comprising detecting a lapse of a predetermined interval following said multicasting of said label request.

16. The method of claim 13 further comprising determining which egress gateways from said plurality of egress gateways are associated with a virtual private network.

17. The method of claim 13 further comprising confirming said designated gateway by sending a confirmation message to said plurality of egress gateways, said confirmation message being indicative of said designated gateway from said plurality of egress gateways.

18. The method of claim 17 wherein confirming said designated gateway comprises sending said confirmation message to all egress gateways responding to said label request message.

19. The method of claim 17 wherein confirming said designated gateway comprises sending said confirmation message to those egress gateways, other than said designated gateway, responding to said label request message.

20. The method of claim 13 further comprising selecting a designated router on the basis of said at least one response from said plurality of egress gateways.

21. The method of claim 13 further comprising selecting a designated router from a plurality of responses from said plurality of egress gateways.

* * * * *